No. 11,947. Reissued Nov. 19, 1901.

F. R. WHITE.

BUTTON ATTACHING MACHINE.

(Application filed Mar. 9, 1901.)

7 Sheets—Sheet 1.

Witnesses:
M. Van Nortwick
William P. Goebel.

Inventor:
Franklin R. White
by George Cook
Atty

No. 11,947. Reissued Nov. 19, 1901.
F. R. WHITE.
BUTTON ATTACHING MACHINE.
(Application filed Mar. 9, 1901.)
7 Sheets—Sheet 2.
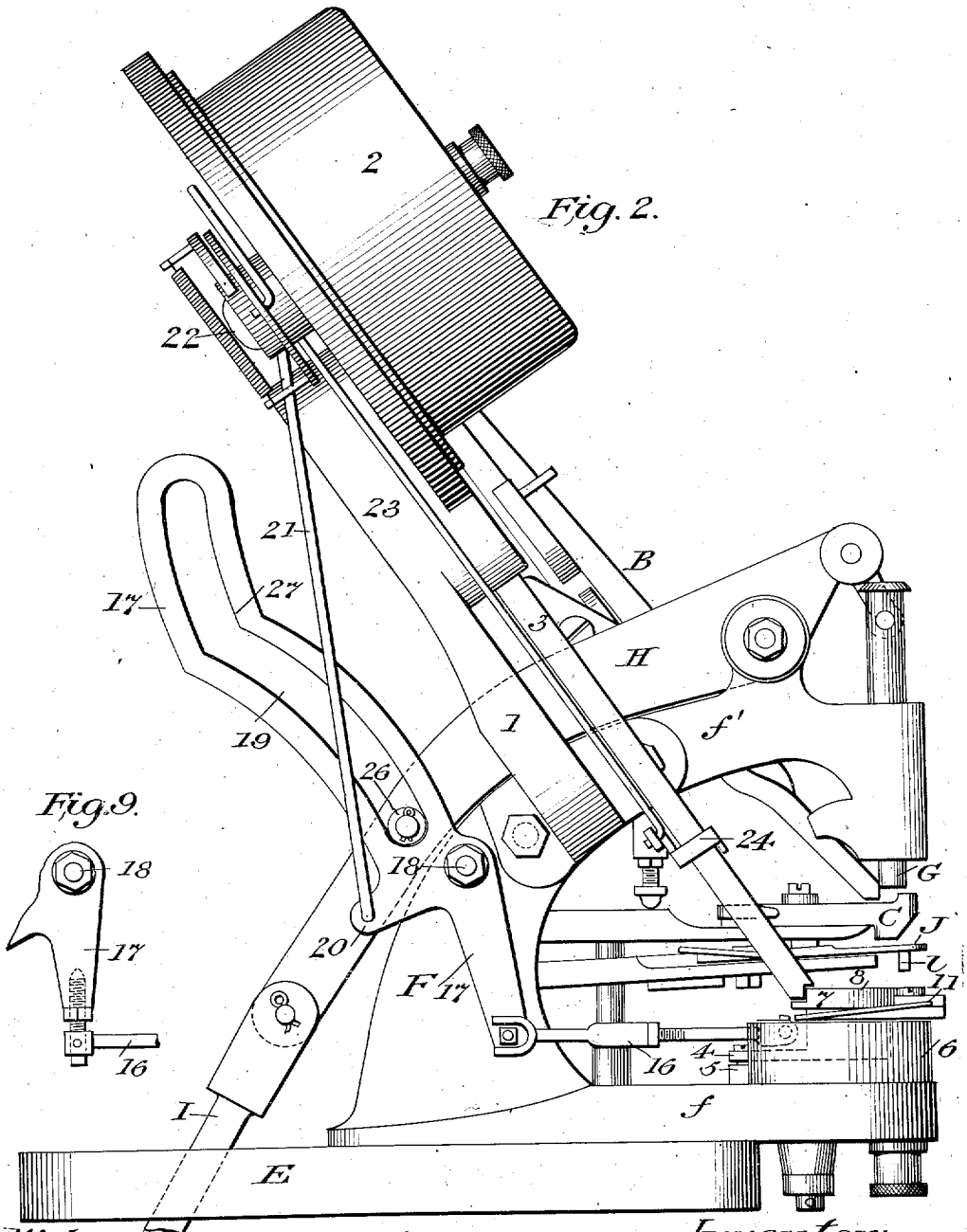
Witnesses:
M. Van Northwick
William P. Goebel.
Inventor:
Franklin R. White
by George Cook
Atty.

No. 11,947. Reissued Nov. 19, 1901.

F. R. WHITE.

BUTTON ATTACHING MACHINE.

(Application filed Mar. 9, 1901.)

7 Sheets—Sheet 3.

Witnesses
M. Van Natwick
William P. Goebel.

Inventor:
Franklin R. White
by Geo. Clark
Atty.

No. 11,947. Reissued Nov. 19, 1901.

F. R. WHITE.

BUTTON ATTACHING MACHINE.

(Application filed Mar. 9, 1901.)

7 Sheets—Sheet 4.

Witnesses:
M. Van Nortwick
William P. Goebel.

Inventor:
Franklin R. White
by George Cook
Atty.

No. 11,947. Reissued Nov. 19, 1901.

F. R. WHITE.

BUTTON ATTACHING MACHINE.

(Application filed Mar. 9, 1901.)

7 Sheets—Sheet 5.

Witnesses:
M. Van Nortwick
William P. Goebel.

Inventor:
Franklin R. White
by George Cook
Atty.

No. 11,947. Reissued Nov. 19, 1901.
F. R. WHITE.
BUTTON ATTACHING MACHINE.
(Application filed Mar. 9, 1901.)
7 Sheets—Sheet 6.
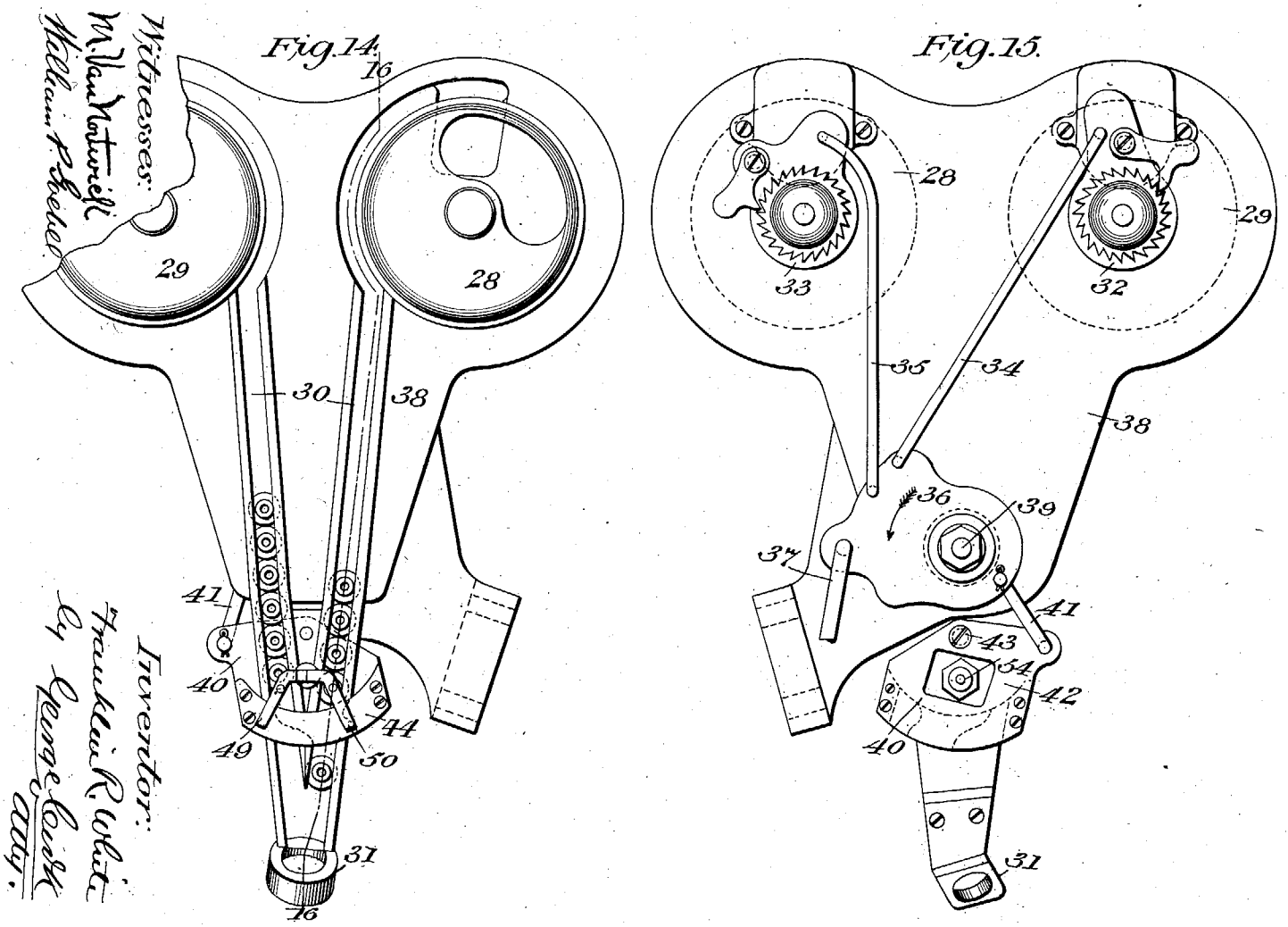

No. 11,947. Reissued Nov. 19, 1901.

F. R. WHITE.

BUTTON ATTACHING MACHINE.

(Application filed Mar. 9, 1901.)

7 Sheets—Sheet 7.

Witnesses:
M. Van Nortwick
William P. Goebel

Inventor:
Franklin P. White
by George Clark
Atty.

UNITED STATES PATENT OFFICE.

FRANKLIN R. WHITE, OF WATERBURY, CONNECTICUT, ASSIGNOR TO THE PATENT BUTTON COMPANY, OF WATERBURY, CONNECTICUT.

BUTTON-ATTACHING MACHINE.

SPECIFICATION forming part of Reissued Letters Patent No. 11,947, dated November 19, 1901.

Original No. 624,279, dated May 2, 1899. Application for reissue filed March 9, 1901. Serial No. 50,511.

*To all whom it may concern:*

Be it known that I, FRANKLIN R. WHITE, a citizen of the United States, and a resident of Waterbury, in the county of New Haven and State of Connecticut, have invented certain new and useful Improvements in Button-Attaching Machines, of which the following is a specification.

My invention relates to an improvement in machines for securing buttons to cloth or fabric, and more particularly adapted for use in connection with that kind or class of buttons known and referred to as "tack" or "rivet" buttons, the object of the same being to provide a device of this character which shall automatically feed both the tacks and the buttons to their proper relative positions above and below the cloth or fabric for attachment thereto and which shall be simple in construction and effective and certain in its operations.

With these and other ends in view my invention consists in certain novel features of construction and combinations of parts, as will be hereinafter fully described, and specifically pointed out in the claims.

Figure 1:
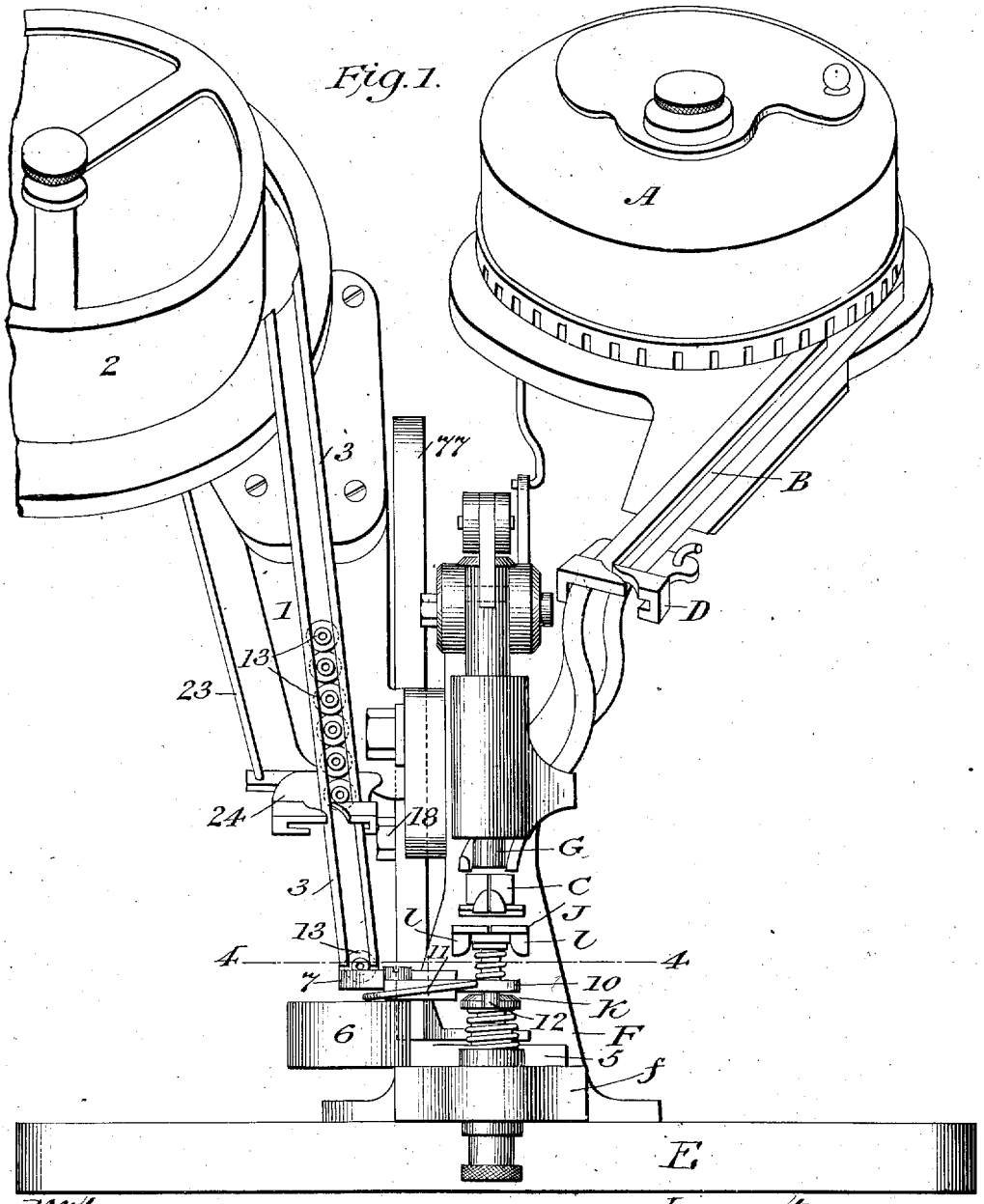
Figure 7:
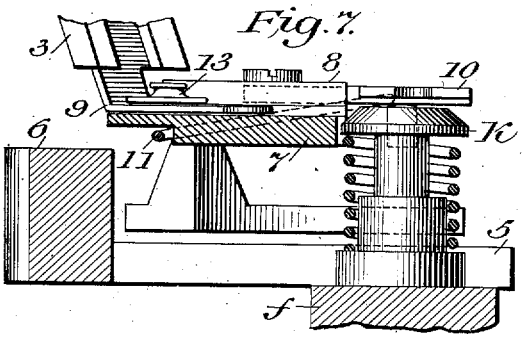
Figure 8:
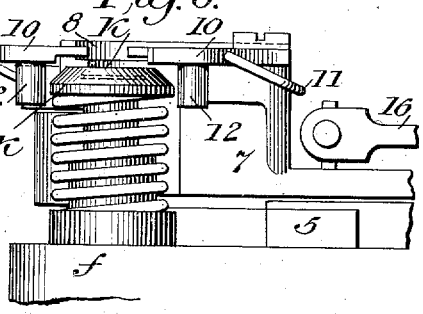
Figure 3:
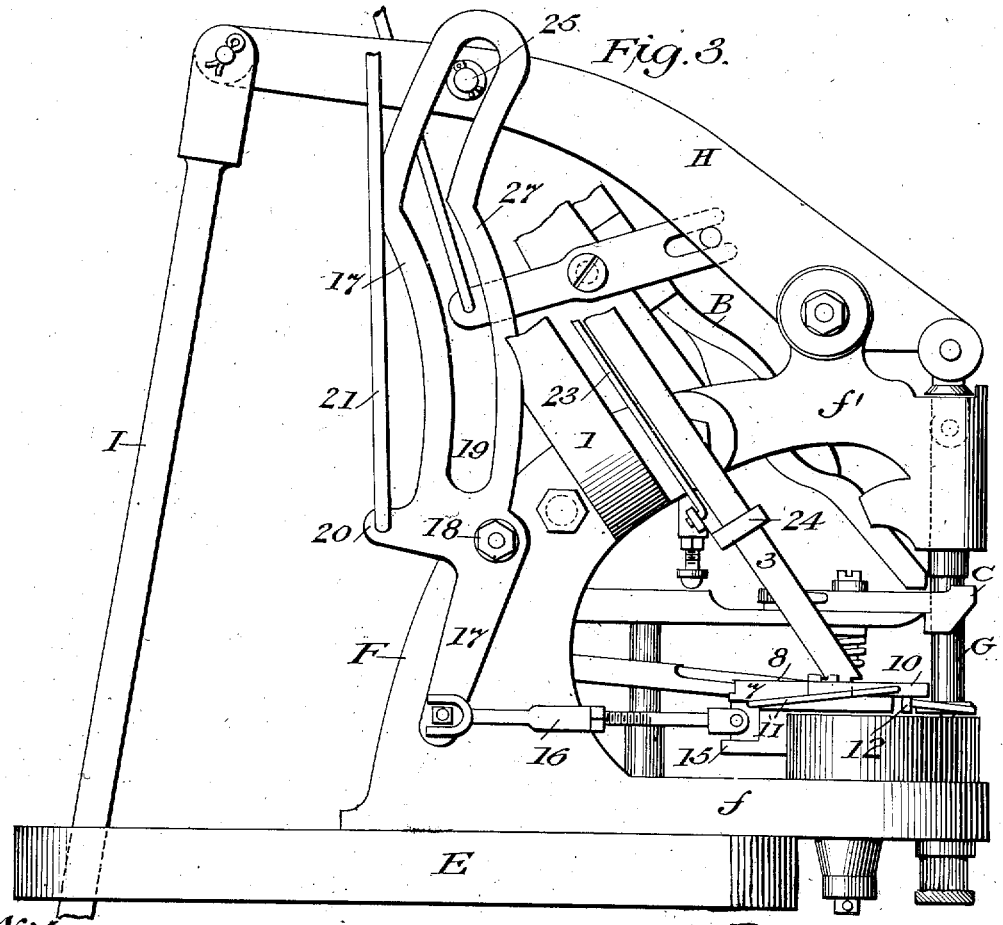
Figure 4:
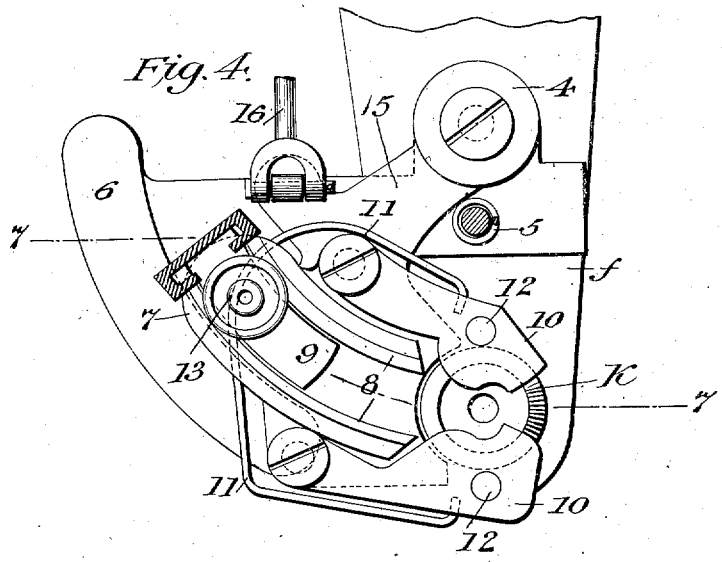
Figure 5:
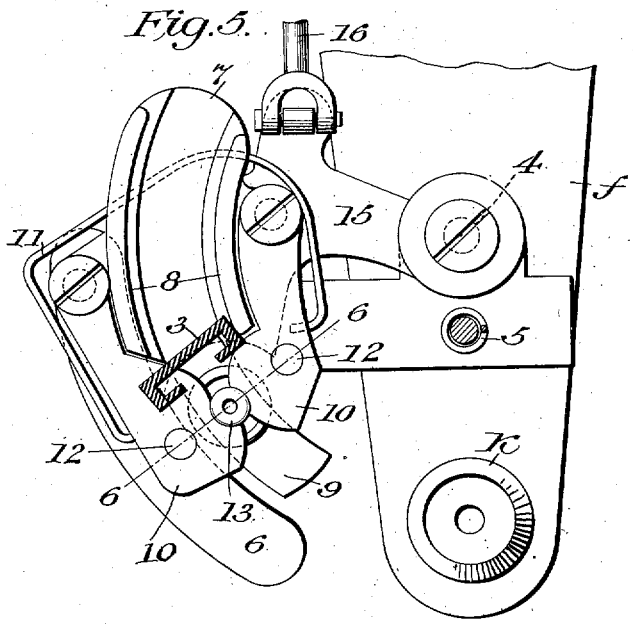
Figure 6:
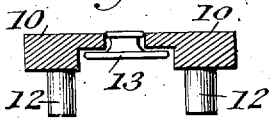
Figure 10:
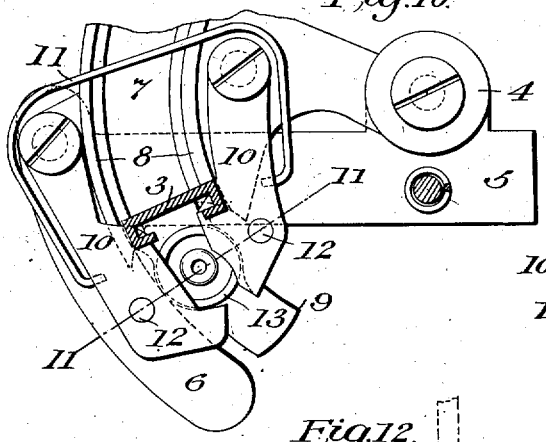
Figure 11:
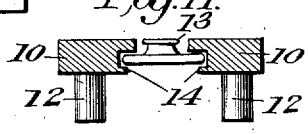
Figure 12:
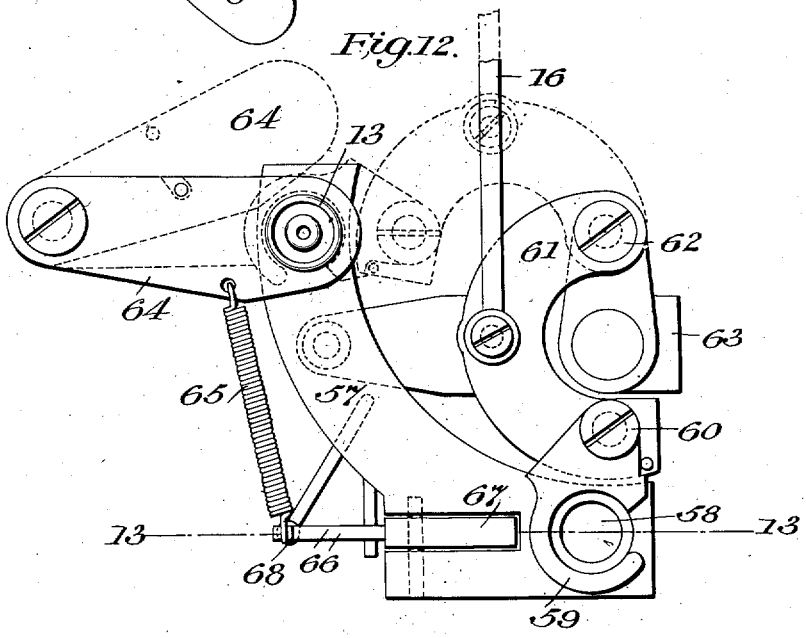
Figure 16:
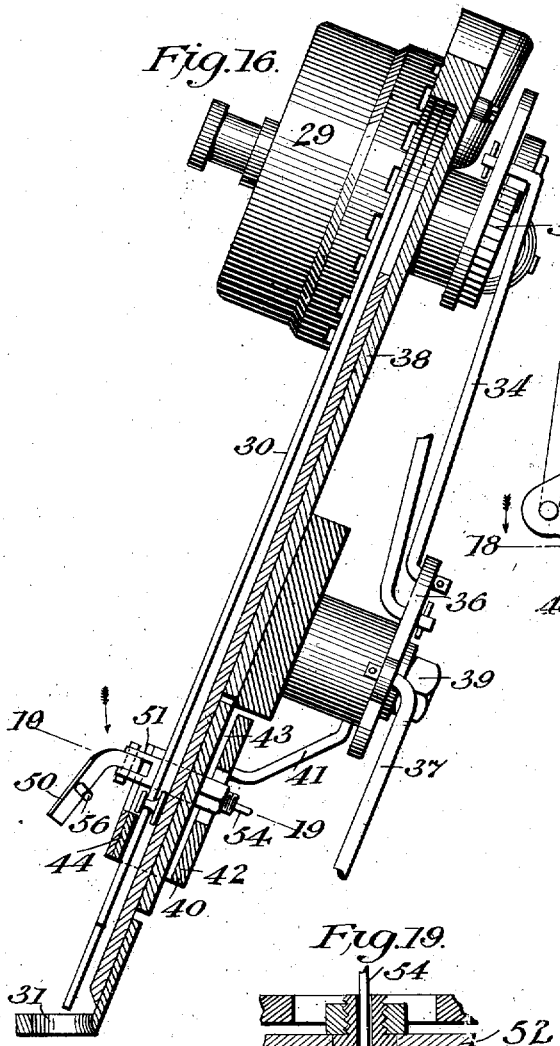
Figure 20:
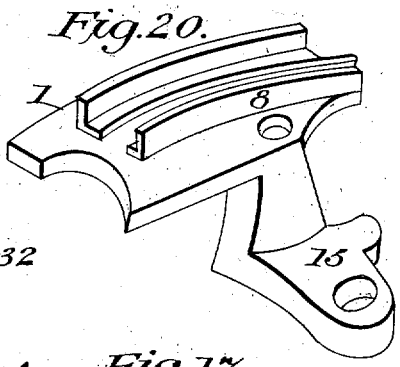
Figure 17:
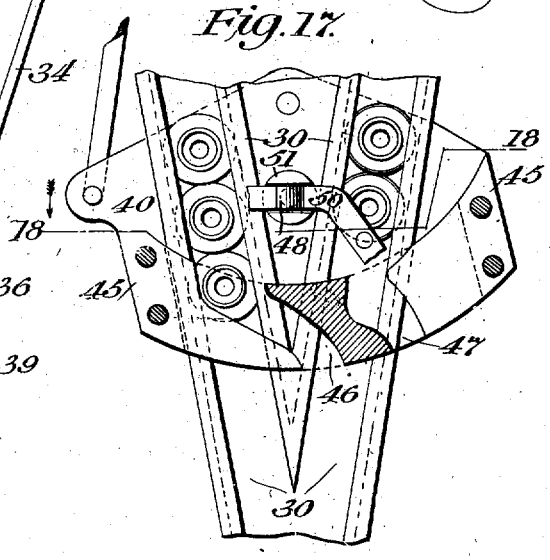
Figure 19:
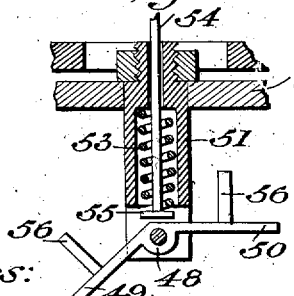
Figure 18:
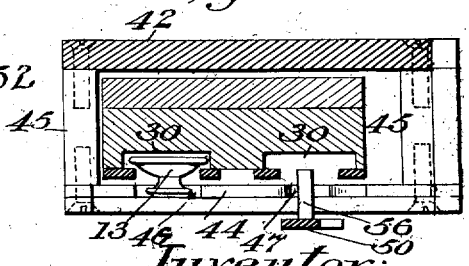

In the accompanying drawings, Figure 1 is a front view of my improved button-attaching machine, the supporting legs or standards and treadle being omitted. Fig. 2 is a side view thereof. Fig. 3 is a similar view showing the several parts in their proper relative positions when securing a button to the cloth or fabric. Fig. 4 is a sectional view taken on the line 4 4 of Fig. 1. Fig. 5 is a similar view showing the several parts in a different adjustment. Fig. 6 is a sectional view taken on the line 6 6 of Fig. 5, the carriage support or track being omitted. Fig. 7 is a sectional view taken on the line 7 7 of Fig. 4. Fig. 8 is an end view of button carriage and support. Fig. 9 is a modification of adjusting devices for one of the connecting-rods. Fig. 10 is a view similar to Fig. 5, but showing a modified form of gripping-jaws. Fig. 11 is a sectional view taken on the line 11 11 of Fig. 10. Fig. 12 is a plan view of a modified form of carriage, and Fig. 13 a sectional view of the same, taken on the line 13 13 of Fig. 12. Fig. 14 is a face view showing two button-hoppers, chutes, and cut-off. Fig. 15 is a rear view of the same. Fig. 16 is a sectional view taken on the line 16 16 of Fig. 14. Fig. 17 is an enlarged detail view of a portion of the double chute and cut-off. Fig. 18 is a sectional view taken on the line 18 18 of Fig. 17 looking in the direction of the arrow. Fig. 19 is a sectional view taken on the line 19 19 of Fig. 16 looking in the direction of the arrow. Fig. 20 is a perspective view of the detached carriage-plate, the gripping-jaws being omitted.

By referring to the drawings it will be seen that I have shown my several improvements attached to a machine like that patented to myself and I. G. Platt April 21, 1891, No. 450,828, in the present drawings A representing the rotating hopper, into which the tacks or rivets are fed and from which they escape point up into the twisted chute or incline B, finally dropping point down into the receiving-jaws C, the feed of said tack or rivets being regulated by means of the cut-off D.

E represents the base or bed plate, to which is bolted or otherwise secured the main frame F, consisting of a bed $f$ and curved arm $f'$, the latter containing the reciprocating plunger G, operated by means of the lever H, pivoted to said curved arm $f'$ of the main frame, and which in turn is operated by means of the connecting-rod I, to which is secured a treadle. (Not shown.) To the main frame of the machine are also indirectly secured the spring-actuated and separating plates J for supporting the fabric while the button is being attached thereto, a button-support K and its contained anvil being secured to the forward end of the base of the main frame.

The several parts above mentioned are constructed and arranged in all material respects similar to those shown in the patent above referred and operate in substantially the same way—that is, the tacks or rivets feed from the hopper A down the twisted chute B into the receiving-jaws C. The plunger G being forced downwardly enters the receiving-jaws C, and striking or pressing upon the head of the tack or rivet carries the same downwardly with the receiving-jaws until the rivet is forced through the fabric resting upon the supporting-plates J. The plunger being continued downwardly, the jaws C are forced open and the rivet or tack forced out of the same and the cloth and plates J carried downwardly until the point of the rivet passes through the opening in the center of the button resting upon the support K, whereupon it is overturned by striking on the die contained within the button or upon the heading-pin contained within said button-support. The plunger is then permitted to rise and the remaining parts allowed to resume their normal positions.

To the curved arm $f'$ is bolted or otherwise secured the arm or bracket 1, having secured to the upper end thereof a revolving button-hopper 2, from which leads the button-chute 3, the lower end of the latter being in about the same horizontal plane with the button-support K and a little to one side thereof. To the bed-plate $f$ is also bolted or otherwise secured at 4 the bracket or arm 5, the outer free end of which is bent or raised and forms a stationary track or support 6 for the movable button-carriage to slide on, the latter consisting of the movable curved plate 7, provided with the raised flanges 8, between which fits the bent end 9 of the chute 3. To the plate 7 is also pivoted one end of the jaws 10, the normal positions of which are shown in Fig. 4, the said jaws having inserted in the outer edges thereof the ends of the spring 11, the tendency of which is to close said jaws when the plate 7 is moved rearwardly, as shown in Fig. 5, and keep the inner edges thereof against the raised flanges 8.

The forward free ends of the jaws are provided with the downwardly-extending lugs or projections 12, which when the jaws 10 move to their forward position, as shown in Fig. 4, strike against the button-support K, as shown in Fig. 8, and separate said jaws, thereby releasing the button contained or gripped between them and permitting it to drop onto the button-support K, as will be explained hereinafter. As soon as the plate 7, with its attached jaws, is moved rearwardly the lugs 12 slide off the support K and the forward ends of said jaws are closed together by means of the spring 11, as shown in Fig. 5, the purpose of said jaws being to grip the button 13 and carry it from off the lower bent end 9 of the chute 3 to the button-support K and deposit it thereon.

The ends of the gripping-jaws 10 will be shaped in conformity with the shape of the button—as, for instance, in Fig. 6 I have shown the ends of the jaws 10 so cut away as to fit tightly around and against the hub of the button and in Fig. 11 with recesses 14 cut therein to receive the top plate or flange of the button, the essential requirement being that the jaws shall tightly hold the button therein while traveling from the bottom of the chute to the button support or receiver.

To the arm 15 of the plate 7 is secured the connecting-rod 16, made adjustable, as shown in Fig. 2, by forming the same of sections threaded one into the other and allowing it to be lengthened or shortened, or, as shown in Fig. 9, by securing the rear end to a rod or bolt threaded into the lower end of the lever 17, thereby lengthening or shortening the latter. As shown in Figs. 2 and 3, the rear end of the rod 16 is connected to the lower end of the lever 17, which in turn is fulcrumed at 18 to the curved arm $f'$ of the frame F, which lever 17 has formed in the upper end thereof a cam-slot 19, the lower portion curved in one direction and the upper portion in the opposite direction, the purpose and effect of which will be hereinafter explained.

To a projection 20 on the lever 17 is secured one end of a rod 21, the opposite end being secured to device 22, constructed and arranged in the usual manner for revolving the hopper 2 when said rod is raised or lowered, and to which device 22 is also secured the upper end of the rod 23, the lower end of the latter being secured to the cut-off 24, pivoted to and extending across the chute 3 and operating in the usual manner to regulate the feed of the buttons down said chute, it being understood, of course, that when the rod 21 is raised the hopper 2 will be partially revolved and the cut-off 24 simultaneously moved to allow one button to pass beyond the same. To the lever H, Figs. 2 and 3, is secured the projecting pin or stud 25, on which is mounted the roller 26, fitting and traveling in the said slot 19, the effect of which is to rock the lever 17 when the said lever H is raised or lowered.

From the above it will be understood that when the rear end of the lever H is raised the hopper A will be partially revolved and the cut-off D allow a rivet to pass down into the receiving-jaws C. At the same time the hopper 2 will be revolved and the cut-off 24 allow a button to pass the same and drop to the end of the chute onto the bent end 9, as shown in Fig. 4. As the rear end of the lever H is raised the roller 26 rides up the cam-slot 19, forcing the lower end of the lever rearwardly and drawing the upper part forward, this motion continuing until the roller arrives at the point 27, where the direction of the cam-slot changes. From the point 27 to the upper end of the cam-slot the roller travels without moving the lever 17, as that portion of said slot forms the true path for the roller. While the lower end of the lever 17 moves rearwardly, the carriage-plate 7, with its attached gripping-jaws 10, also moves rearwardly through the medium of the connecting-rod 16, said plate 7 bearing and sliding on the support 6. When the carriage arrives at the end of the chute 3, the ends of the jaws 10 grip the button 13, as before described, this occurring when the roller 26 reaches the point 27 in the cam-slot 19. During the rearward movement of the button-carriage the plunger G has descended by reason of the lowering of the forward end of the lever H and carries the tack and jaws C down onto the cloth and plates J, the carriage remaining in the position as above described—that is, as shown in Fig. 5. The plunger is continued downwardly, passing the rivet through the cloth and into and through the button resting on the support K, dropped there by the previous stroke of the machine. The treadle being released, the rear end of the lever H begins to lower and the plunger G to rise, this action continuing while the roller travels from the upper end of the cam-slot 19 to the point 27, whereupon, by reason of the roller traveling in the lower portion of the cam-slot, the upper end of the lever 17 is forced rearwardly and the lower end forward. As said lower end travels forward the carriage, with the button 13 between the jaws 10 thereof, is brought forward until the rear end of the lever H is entirely lowered and the plunger G entirely raised, and at which time the lugs 12, striking the sides of the support K, force the jaws 10 open, as shown in Fig. 4, allowing said button to drop thereon, placing it for the next stroke of the plunger. As the plunger rises the cut-off allows a rivet to pass and the cut-off 24 a button to drop onto the end 9 of the chute 3, ready for the jaws 10 when again forced rearwardly. In other words, a button drops into the support K simultaneously with the dropping of a rivet into the jaws C.

As shown in Figs. 14 and 15, I may, if desired, construct the machine with two button-hoppers 28 and 29, secured to the bracket or support 38 and adapted to contain different kinds or shapes of buttons and feed from either, as desired. From each of the hoppers leads a chute 30, joining at their lower ends and provided with the ring or collar 31, through which the button drops onto the button-carriage. The usual devices 32 and 33 will be secured in the rear of the hoppers for causing their revolution, the rods 34 and 35 being secured to plate 36, which in turn is secured at 39 to the bracket 38 and by the rod 37 to the projection 20 on the lever 17, Fig. 2. The plate 36 is connected with the cut-off 40 by means of the rod or link 41, said cut-off 40 consisting of the rear plate 42, pivoted at 43, front plate 44, and sides 45, two channels 46 and 47 being provided in the front plate 44 for allowing the buttons to pass when the cut-off is swung from side to side. It will be understood from the above that when the lever H is raised and lowered and the lever 17 moved accordingly the rod 37, Fig. 15, connected with the latter, will move the plate 36, causing a partial revolution of the hoppers 28 and 29 and also causing a movement of the cut-off 40 across the two chutes 30, the channels 46 and 47 in turn registering with the troughs of the chutes and allowing the buttons to clear the same.

In order to prevent the feed of buttons from both hoppers at one time, I provide an interfering-bar 48, provided with two sides or arms 49 and 50, bent at an angle to each other, as shown in Fig. 19, and pivoted at the bend therein to one end of the post 51, the opposite end of the latter being secured in the plate 52 at the rear of the lower portions of the chutes 30. In the post 51 is contained the spring 53, coiled around the bar or pin 54, the latter having secured thereto the plate 55, the tendency of the spring being to keep the latter against one arm of the bar 48 and retain it in its desired adjustment. On each of the arms 49 and 50 is a pin or lug 56, one of which projects into its respective chute 30, and thereby prevents the buttons in that particular chute from feeding to the cut-off. From the shape of the bar 48 it will be seen that by pressing down on the arm 49 the pin 56 will enter its respective chute and cut off the descent of the buttons therein, while at the same time the arm 50 will be raised and the pin 56 raised from its respective chute, thus allowing the buttons in that particular chute to feed to the cut-off 40, and vice versa, the spring 53 retaining the bar 48 in either of its adjustments.

Figure 13:
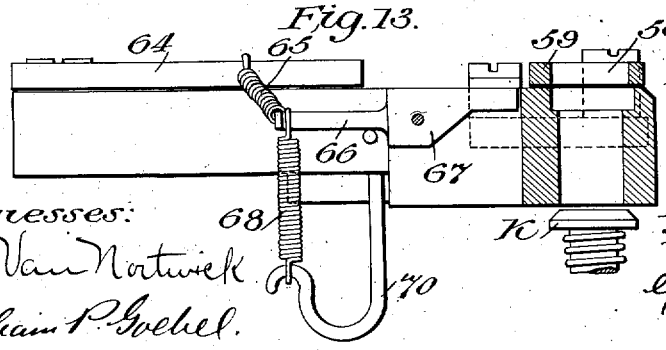

I would have it understood that I do not limit my invention to the particular construction and arrangement of parts as shown and described, as it will be evident to those skilled in the art that many changes might be made therein without departing from the spirit of my invention—as, for instance, in Figs. 12 and 13 I have shown a modification of the button-carriage wherein the support 57 on which the carriage slides is made somewhat longer than in the first instance and extended so that the opening 58, formed in the end thereof, will lie directly over the button-support K and allow the button to drop thereon. Instead of employing two jaws, as before described, one may be made use of, as shown at 59, the shape thereof somewhat resembling a hook, and pivoted at 60 to the lever or plate 61, the latter in turn being pivoted at 62 to the plate 63. To the support 57 is also pivoted the plate 64, which lies directly below the end of the chute leading from the button-hopper and onto which the button falls, a spring 65, secured thereto and to a pin 66, retaining said plate in its normal position, as shown in Fig. 12. To the plate 61 is secured one end of the rod 16, which when drawn rearwardly by the lever 17, as described in the first instance, draws the said plate 61 and its attached hooking-jaw 59 with it until said jaw forces back the plate 64, as shown in dotted lines, and allows the button resting thereon to fall into the said jaws. As the direction of the several parts are changed the jaw 59, sliding on the support 57, carries the button with it until the opening in said jaw registers with the opening 58 in the end of the support 57, whereupon the button is deposited through said openings onto the button-support K, as in the first instance, the plate 64 in the meantime having returned to its normal position below the chute through the medium of the spring 65. In this instance I secure in the support 57 a pivoted plate 67, held in its normal position flush with the top of said support 57 by means of the spring 68, one end of which is connected with the outwardly-projecting pin 66 on said plate and the opposite end with the hook 70, secured to said support 57, the free end of said plate 67 yielding or lowering when one of the lugs or shoulders *l* in the yielding plates J strikes it, the said plate 67 returning to its normal position when said plates J are raised. This construction and arrangement of parts allows the lug *l* on one of the plates J to enter the support 57 when said plates J are lowered, the end of the plate 67, against which the lug strikes, yielding, as before described. When the plates J are raised, the plate 67 returns to its normal position—that is, flush with the surface of the support—thereby imparting to the latter a smooth unbroken surface for the next button to travel on and over.

The machine is very simple in construction and in practice operates with certainty and precision, every stroke thereof effectually securing the button to the cloth, the buttons and rivets feeding to the support K and jaws C automatically, leaving nothing for the operator to do but place the fabric properly on the plates J and work the treadle.

Having fully described my invention, what I claim as new, and desire to secure by Letters Patent, is—

1. In a button-attaching machine, the combination with a rivet-hopper, chute and setting devices, of a button-hopper and a chute leading therefrom, a button-support, a button-carriage consisting of spring-actuated jaws and horizontal track or support therefor, and means for moving said carriage on said track to and over said button-support, substantially as described.

2. In a button-attaching machine, the combination with a button and rivet-hoppers, of chutes leading therefrom, a rivet-receiver and setting devices, a button-support located below said rivet-receiver, a movable button-carriage consisting of horizontally-moving jaws for holding the button, and depositing it on said button-support, and a track or support below said jaws upon which the latter travels, substantially as described.

3. In a button-attaching machine, the combination with a button-hopper and a chute leading therefrom, of a button-support, a button-carriage adapted to convey said button from said chute to said support and consisting of a horizontally-moving plate having pivoted thereon spring-actuated jaws adapted to receive the button at the bottom of said chute and to carry and release said button to and over said button-support, and a track or support upon which said moving carriage travels, substantially as described.

4. In a button-attaching machine, the combination with a button-hopper and chute leading therefrom, of a button-support, a carriage consisting of a movable plate provided with raised flanges, spring-actuated jaws pivoted to said plate, and lugs on said jaws for striking the support and opening said jaws, and means, consisting of a cam-lever and rod connecting said lever with said movable plate for operating said carriage, substantially as described.

5. A button-attaching machine, constructed with a button-carriage consisting of a stationary track or support, a movable plate sliding on said support, spring-actuated jaws pivoted to said plate and adapted to clutch and hold the button, and lugs on said jaws adapted to strike a button-support and open said jaws for permitting the button to escape therefrom, substantially as described.

6. In a button-attaching machine, the combination with two hoppers, of converging chutes leading therefrom and merging into a common chute at their lower ends, and means for opening and closing either of said converging chutes, said means consisting of a pivoted bar, provided with two bent arms, each of said arms being provided with a pin or lug adapted to enter its respective chute, substantially as described.

7. In a button-attaching machine, the combination with two hoppers, of converging chutes leading therefrom, and merging into a common chute at their lower ends, and means for opening and closing either of said converging chutes, said means consisting of a pivoted bar, so bent as to form two arms, each arm having a pin or lug extending down therefrom, and each adapted to enter its respective chute, and a spring bearing against said bar, whereby one of said arms is retained in its elevated position while the other is lowered, substantially as described.

Signed at Waterbury, in the county of New Haven and State of Connecticut, this 30th day of November, A. D. 1896.

FRANKLIN R. WHITE.

Witnesses:

LEWIS A. PLATT,

C. M. PLATT.